US007943914B2

(12) United States Patent
Chicklis et al.

(10) Patent No.: US 7,943,914 B2
(45) Date of Patent: May 17, 2011

(54) BACK ILLUMINATION METHOD FOR COUNTER MEASURING IR GUIDED MISSILES

(75) Inventors: Evan P. Chicklis, Nashua, NH (US); John L. Barrett, Pelham, NH (US)

(73) Assignee: BAE Systems Information and Electronic Systems Integration, Inc., Nashua, NH (US)

( * ) Notice: Subject to any disclaimer, the term of this patent is extended or adjusted under 35 U.S.C. 154(b) by 2220 days.

(21) Appl. No.: 10/449,974

(22) Filed: May 30, 2003

(65) Prior Publication Data

US 2009/0250634 A1 Oct. 8, 2009

(51) Int. Cl.
*G01J 1/00* (2006.01)

(52) U.S. Cl. ............... 250/495.1; 250/201.9; 250/203.1; 250/203.2

(58) Field of Classification Search ........................ None
See application file for complete search history.

(56) References Cited

U.S. PATENT DOCUMENTS

| | | | | | |
|---|---|---|---|---|---|
| 3,743,217 | A | * | 7/1973 | Turck | 244/3.16 |
| 3,974,985 | A | * | 8/1976 | Campbell et al. | 244/3.16 |
| 4,004,948 | A | * | 1/1977 | Smith | 136/201 |
| 4,030,807 | A | * | 6/1977 | Briney | 359/220.1 |
| 4,092,531 | A | * | 5/1978 | Moss | 250/216 |
| 4,291,848 | A | * | 9/1981 | Clark | 244/3.16 |
| 4,492,352 | A | * | 1/1985 | Yueh | 244/3.15 |
| 4,917,330 | A | * | 4/1990 | Dulat et al. | 244/3.16 |
| 5,200,606 | A | * | 4/1993 | Krasutsky et al. | 250/216 |
| 5,244,849 | A | * | 9/1993 | Roy et al. | 501/120 |
| 5,300,780 | A | * | 4/1994 | Denney et al. | 250/342 |
| H1522 | H | * | 4/1996 | Campillo et al. | 239/8 |
| 5,600,434 | A | * | 2/1997 | Warm et al. | 356/139.08 |
| 5,693,951 | A | * | 12/1997 | Strong, III | 250/504 R |
| 5,747,720 | A | * | 5/1998 | Schnurr et al. | 89/1.11 |
| 5,780,838 | A | * | 7/1998 | Livingston et al. | 250/203.2 |
| 5,780,839 | A | * | 7/1998 | Livingston | 250/203.2 |
| 5,788,500 | A | * | 8/1998 | Gerber | 434/22 |

(Continued)

FOREIGN PATENT DOCUMENTS

JP 63216108 A * 9/1988

(Continued)

*Primary Examiner* — Bernard E Souw
*Assistant Examiner* — Andrew Smyth
(74) *Attorney, Agent, or Firm* — Daniel J. Long, Esq.; Robert K. Tendler, Esq.

(57) ABSTRACT

Commercial aircraft are protected from attack by infrared seeking guided missiles through the utilization of a ground-based directed infrared countermeasure system in which the deployment of an IR guided missile is detected off-aircraft and more particularly on the ground. An infrared laser beam is projected towards the detected missile such that the projected laser infrared radiation impinges upon the missile from the rear. The off-axis infrared radiation illuminates the IR transmissive dome at the head of the missile where it is internally reflected back towards the IR detector carried by the missile through the total internal reflection characteristics of the dome. The domes of these missiles are typically made of a high index of refraction IR transmissive materials such that the material is prone to total internal reflection. The infrared laser generated radiation is a modulated so as to interfere with the guidance system of the missile causing it to execute a turn and plunge to the ground. In one embodiment, the long wavelength infrared laser is a 100-W laser with a beam width of 100 microradians, thus to provide a zone of protection of about three miles.

7 Claims, 4 Drawing Sheets

U.S. PATENT DOCUMENTS 5,936,229 A * 8/1999 Livingston ................. 250/203.2
5,955,724 A * 9/1999 Livingston ................. 250/203.2
5,973,309 A * 10/1999 Livingston ................. 250/203.1
5,974,072 A * 10/1999 Hartlove et al. ................ 372/89
6,014,922 A * 1/2000 Livingston ..................... 89/1.11
6,057,536 A * 5/2000 Livingston ................. 250/203.2
6,066,842 A * 5/2000 Livingston ................. 250/203.2
6,153,871 A * 11/2000 Livingston ................. 250/203.2
6,265,704 B1 * 7/2001 Livingston ................. 250/203.2
6,366,356 B1 * 4/2002 Brosnan et al. ............... 356/477
6,367,970 B1 * 4/2002 Danielson ....................... 374/43
6,527,222 B1 * 3/2003 Redano ........................ 244/3.14
6,584,879 B2 * 7/2003 Gorman ......................... 89/1.11
6,587,486 B1 * 7/2003 Sepp et al. ....................... 372/22
6,738,012 B1 * 5/2004 Kirkpatrick ..................... 342/67
6,739,547 B2 * 5/2004 Redano ........................ 244/3.14
6,782,790 B2 * 8/2004 Barrett ........................... 89/1.11
6,872,960 B2 * 3/2005 Pepper et al. .............. 250/495.1
6,885,002 B1 * 4/2005 Finch et al. ................... 250/332
6,894,828 B2 * 5/2005 Pelouch et al. ............... 359/333
7,023,765 B2 * 4/2006 Nagoya et al. ............. 369/44.12
2002/0153497 A1 * 10/2002 Pepper et al. .............. 250/495.1
2003/0048740 A1 * 3/2003 Nagoya et al. ........... 369/112.28
2003/0052221 A1 * 3/2003 Redano ........................ 244/3.14
2004/0008405 A1 * 1/2004 Pelouch et al. ............ 359/341.3
2004/0021033 A1 * 2/2004 Redano .......................... 244/3.1

FOREIGN PATENT DOCUMENTS

JP 04086499 A * 3/1992
JP 05018699 A * 1/1993
JP 2000065497 A * 3/2000

* cited by examiner

BACK ILLUMINATION METHOD FOR COUNTER MEASURING IR GUIDED MISSILES

FIELD OF INVENTION

This invention relates to countermeasure techniques and more particularly to countermeasuring missiles by illuminating the missile from the rear with an appropriately modulated laser beam.

BACKGROUND OF THE INVENTION

The wide proliferation of IR missiles both air-air and surface-to-air has led to the military development of a variety of infrared countermeasure systems. This includes such systems as cued IR flares, towed IR decoys, omnidirectional on-board jammers and lamps and laser based directable jammers.

Of these types the only effective jammers for protection of large aircraft against the large inventory of missiles is the directable laser jammer, also known as DIRCM or the Directed Infrared Countermeasure System.

DIRCM systems operate based on a cue from a missile's warning system that slews a pointing and tracking sensor to track the threat missiles and then emits laser jammer radiation onto the missile dome. These systems are co-located on the aircraft and emit modulated waveforms which deceive the missile guidance. The on-board systems are designed to operate on the centerline of the missile's axis.

Commercial aircraft and other aircraft which are not protected by active jamming systems such as the directed infrared countermeasure systems, are particularly vulnerable to shoulder-launched missiles especially when the aircraft descends below 10,000 feet, currently the effective maximum altitude for such missiles.

Military aircraft carry a wide variety of DIRCM systems the purpose of which is to detect an incoming missile usually by detecting its plume, and then gimbling the laser optics to project a modulated infrared laser beam directly on-axis so as to countermeasure the guidance system for the missile by causing it to veer off the target.

Typically, the missile is aimed directly at the targeted aircraft such that providing a modulated laser beam directly towards the missile to countermeasure the missile jams the missile's guidance system. To do this the laser beam impinges on the transparent dome protecting the missile's seeker directly along the missile's centerline at a 0° intercept angle.

It has been found when the laser beam impinges on the transparent dome of the missile at angles greater than 3°, the amount of jamming radiation reaching the missile's IR detector is significantly reduced. Thus, in the past it was thought that any effective laser jamming of the missile had to involve the head-on illumination of the missile's seeker. Off-axis illumination of the missile's seeker was found not to be particularly effective.

Note that for aircraft-carried DIRCMs, the success rate of countermeasuring infrared seeker missiles has been exceedingly high. The problem however in providing commercial aircraft with DIRCMs is both a perceptional problem from the point of view of the passengers and also a cost problem. Moreover, there is a problem of retrofitting the many existing commercial aircraft even if cost is not an issue. In order to retrofit a commercial aircraft, one has at the very least to mount a pod on the aircraft, which pod includes cutting a hole in the skin of the aircraft, thus breaching airframe integrity. Note also that the current cost of the DIRCM hardware is on the order of one million dollars, with the cost of retrofitting the aircraft being an additional one million dollars.

If cost where not enough of a deterrent for commercial aviation, the provision of a pod on a commercial aircraft is clearly visible by passengers and is frightening to them. This impediment in addition to having implications for drag, fuel efficiency and logistics presents a challenge. Thus having the infrared countermeasure pod visible creates passenger anxiety. Also having a large crew required for maintenance, testing and boresighting at each turn around for the plane results in a small army of people descending on the plane to ready the DIRCM for the flight, likewise an anxiety producing experience.

As can be seen, both the perceptual problem and the cost of modifying the aircraft, the cost of logistics, the cost of servicing and the cost of system calibration does not provide ready feasibility for aircraft-carried DIRCM type systems.

Aside from infrared laser-based countermeasure systems, other systems for protecting aircraft include LAMP-based DIRCM systems. However, the LAMP-based systems do not cover the required infrared band necessary for jamming modern missile seekers.

It is of course possible and not very expensive to eject flares as decoys to countermeasure shoulder-launched missiles. However, utilizing flares over a populated area is impractical because the flares can start fires. Thus flare type countermeasures are not acceptable in an urban environment.

Some have proposed to put up an IR chaff cloud of hot metal particles that radiate in the infrared region of the electromagnetic spectrum. However, every time an aircraft is to descend below 10,000 feet to land the idea of dumping hot metal out of the tail of the aircraft is unacceptable especially over populated areas.

Another potential solution is to illuminate a portion of the wing with a laser to create a false target on the wing. While analysis supports the fact that an aircraft can survive a missile hitting the wing, while the aircraft might survive, the airline industry could not advocate such a solution.

Another type of countermeasure device which has been proposed is providing a fuel-fired mantle which involves towing an IR radiator behind the aircraft. However, the cost and complexity of such a system is a deterrent for such an application; and one cannot conceive of landing a plane towing a radiator behind it.

SUMMARY OF THE INVENTION

Rather than countermeasuring the infrared seeker of a missile through the provision of appropriately modulated on-axis radiation from the aircraft, in the subject invention it has been found that illuminating the missile with a laser beam from behind results in a sufficient amount countermeasuring signal to be introduced into the detector of the missile that the seeker can be jammed. The radiation aimed up at the missile impinges on the transparent dome covering its seeker, with radiation passing through the dome from behind at an angle which assures total internal reflection due to the high index of refraction of the dome material. The result is that all captured radiation finally arrives at the detector utilized in the seeker. Typically the dome used to protect seekers is made of a high index of refraction material to permit the transmission of infrared therethrough.

What this means is that shoulder-fired missiles can be countermeasured by locating a number of DIRCMs on the ground and gimbeling the laser of the DIRCM to provide a beam of modulated long wavelength infrared energy towards the head of the missile. Thus rather than modifying the aircraft with the provision of DIRCM pods, one can protect the flight path especially around airports and the like by locating an array of land-based DIRCMs at least along those flight paths that are below 10,000 feet.

It will be appreciated that aircraft generally fly above 10,000 feet and only descend to below 10,000 feet when they are landing; or are below 10,000 feet when they are taking off.

It is therefore envisioned that the subject system may be utilized at, for instance, positions within ten miles of an airport and thus protect commercial aircraft when they are taking off and landing.

In one embodiment, a DIRCM system operating in the 3 to 5 micron range is used to detect the launch of a missile as by detecting its plume either in the UV or IR, or may use radar detection techniques. The laser beam from the DIRCM is then gimbaled towards the head of the missile. In one embodiment, a 100-W laser is used having a 100 microradian beam width to provide sufficient power on target to be able to countermeasure the missile.

As part of the subject invention it has been found that while off-axis radiation at less than 90° from the optical axis of the seeker is not particularly effective to countermeasure the seeker, after 90° and up to 170° sufficient radiation illuminating the missile from the rear is internally reflected by the seeker dome. This results in sufficient internal optical scattering and reflection, OSAR, in the dome to effectively countermeasure the IR missile's seeker.

Such a back-illuminating system is designed for use in countermeasuring Stinger missiles, Red Eye missiles, and SA18, SA16, SA14, SA9, SA7A & B, AT4 and AT6 missiles. The reason is that for each of these missiles the seeker is provided with a high index of refraction dome on the nose of the missile for protecting its seeker.

Jammers suitable for utilization as DIRCM jammers include a wide variety of laser jammers such as ATRICM units manufactured by BAE Systems, Inc. of Nashua, N.H. for which higher power lasers are available and for which more accurate pointing systems exist.

The subject system completely eliminates the utilization of on-board jamming systems such as LAMP based systems, internal DIRCM based systems, pod-mounted DIRCM based systems, flares, pre-emptive IR chaff, false target generation and towed decoy type systems.

It will be appreciated that providing an off-aircraft laser jamming system is both cost effective, eliminates perceptive problems for passengers and can be instantly deployed by merely deploying the DIRCM on the ground.

The area of protection by such systems depends upon the laser power and the range of the DIRCM. In general, however, between three and ten miles of coverage can be achieved by present laser output levels. Since the amount of time spent by an aircraft under 10,000 feet is typically limited to within ten miles of an airport, then airport protection utilizing the subject system is both cost effective and quick to deploy.

Not only can aircraft be protected near or adjacent an airport, assuming the flight paths of the aircraft are known, DIRCM modules may be located at various strategic points along a projected flight path to provide the necessary protection against infrared guided heat seeking missiles.

In addition to locating the DIRCMs on the ground, one can locate a DIRCM on an escort plane flying both ahead of and behind an aircraft to be protected to be able to jam an incoming missile from the rear. Even though the incoming missile is directed to a plane aft of the escort plane, the missile can be countermeasured through a laser beam from the escort plane as it will impinge on the incoming missile from the rear at an oblique angle to the missile's track. For escort aircraft aft of a targeted aircraft, a laser beam from the following escort aircraft can nonetheless countermeasure the incoming missile from behind when the missile turns to follow the targeted aircraft. In this manner, escort planes can be utilized to protect one or more other aircraft.

In summary, commercial aircraft are protected from attack from guided missiles through the utilization of a ground-based directed infrared countermeasure system in which the deployment of an IR guided missile is detected off-aircraft and more particularly on the ground. An infrared laser beam is projected towards the missile such that the projected laser infrared radiation impinges upon the missile from the rear. The off-axis infrared radiation illuminates the IR transmissive dome at the head of the missile where it is internally reflected back towards the IR detector carried by the missile through the total internal reflection characteristics of the dome. The domes of these missiles are typically made of high index of refraction IR transmissive materials and are prone to total internal reflection. The infrared beam is a modulated so as to interfere with the guidance system of the missile causing the missile to execute a turn and plunge to the ground. In one embodiment, the long wavelength infrared laser is a 100-W laser with a beam width of 100 microradians, thus to provide a zone of protection of about three miles.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
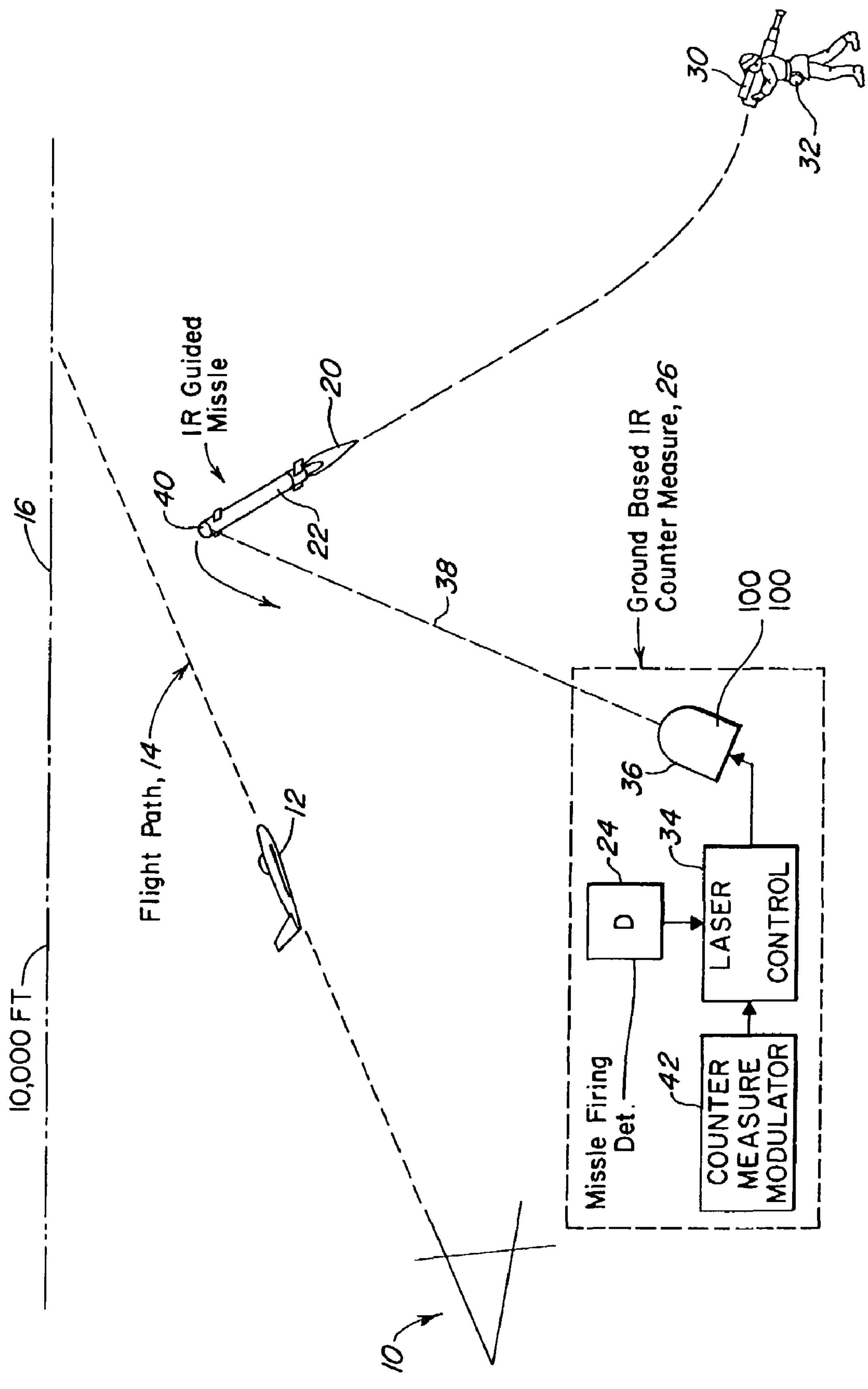
FIG. 1 is diagrammatic illustration of a countermeasure scenario in which an incoming infrared guided missile is countermeasured by jamming radiation from a ground-based directed infrared countermeasure unit which directs a laser beam towards the missile from the rear thereof.

Referring now to FIG. 1, in a typical airfield scenario for about an airfield 10, an aircraft 12 is shown taking off along a flight path 14 until such time as it reaches an altitude of 10,000 feet as illustrated by dotted line 16. It is noted that for most shouldered-launched IR guided missiles, their altitude limit is approximately 10,000 feet.

In order to countermeasure an infrared guided missile the subject system, the plume 20 from an IR guided missile 22 is detected by a detector 24 associated with a ground-based IR countermeasure jamming pod 26. The detector may either be an infrared detector or an ultraviolet detector, or may be any detector which detects the deployment of any such missiles. As can be seen, the missile is shown as being shoulder-launched at 30 by an individual 32 who aims the missile 22 in the direction of the aircraft target sought to be destroyed.

The launching of the missile having been detected by detector 24 activates a laser pointing control unit 34 to gimbal the head 36 of a directed infrared countermeasure front end and projects a laser beam 38 towards the head 40 of missile 22. Countermeasure modulation available at modulator 42 modulates the laser output so as to effectively countermeasure or jam the seeker utilized in missile 22.

It will be appreciated that the jamming device, in this case the ground-based directed infrared countermeasure unit 26, is not located on-aircraft 12 but rather located off-aircraft, thus providing protection for aircraft which do not have specially designed or mounted countermeasure pods or equipment.

Figure 2:
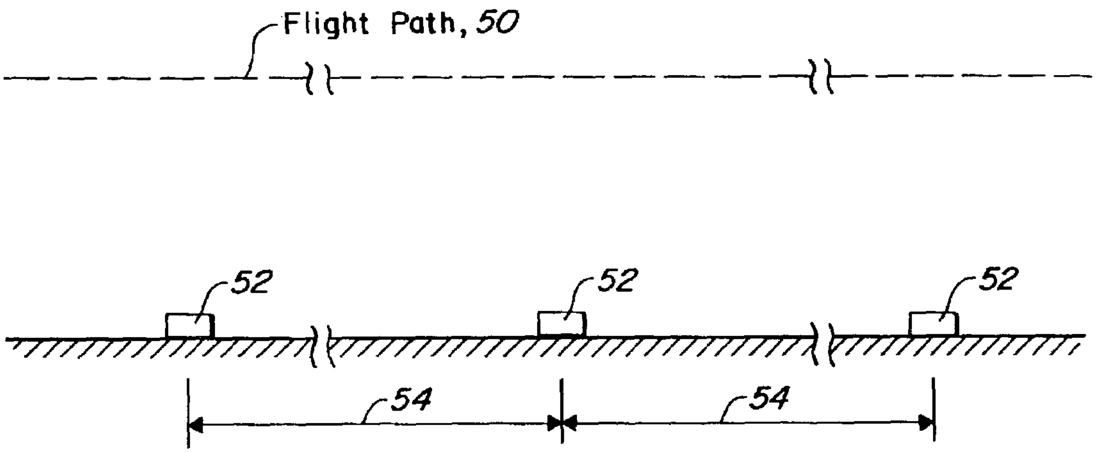
FIG. 2 is a diagrammatic illustration of the deployment of ground-based directed infrared countermeasure pods or modules along the flight path of an aircraft.

Referring to FIG. 2, assuming one can specify a flight path, here illustrated at 50, one can deploy a number of jammer pods or modules 52 along the flight path at spaced intervals to assure coverage along the complete flight path. These jammer modules are in essence any number of a directed infrared countermeasure units, with the modules being spaced apart in one embodiment as illustrated by arrows 54 three miles. The spacing of the units is of course dependent on the amount of available laser output power and the effective beam width of the laser beam. It has been found that more than adequate protection can be achieved with a 100-W laser and a beam width of 100 microradians at 3 to 5 microns.

Figure 3:
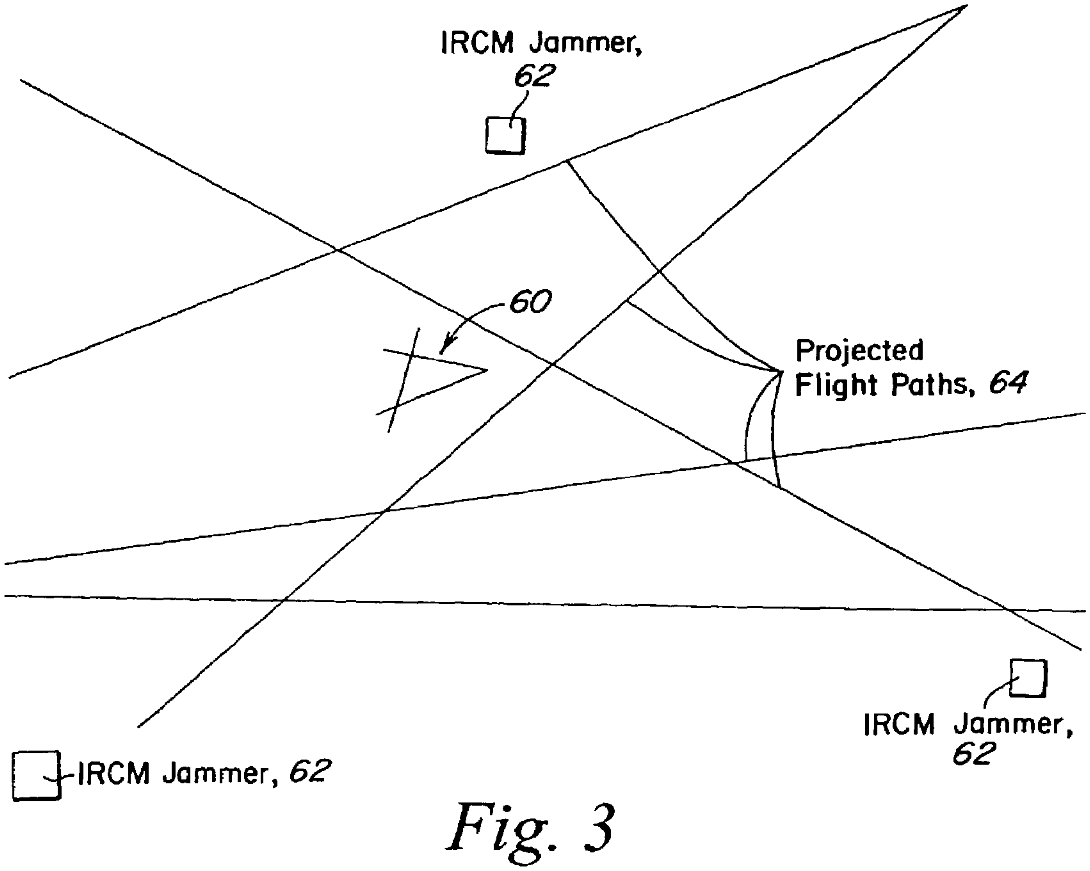
FIG. 3 is a diagrammatic illustration of the protection of a zone about an airport in which a number of DIRCM jammer modules or pods are located about the airport to be able to countermeasure or jam incoming missiles directed at aircraft on various flight paths.

Referring now to FIG. 3, area coverage for an airport 60 can be achieved through the scattering of IRCM jammer modules 62 about the airport, it being understood that around an airport there are a number of projected flight paths 64 which usually exist. All these flight paths include flight below 10,000 feet such that placement of the IRCM jammer modules takes into account the likely flight paths below 10,000 feet, as well as laser output power and beam width.

Figure 4:
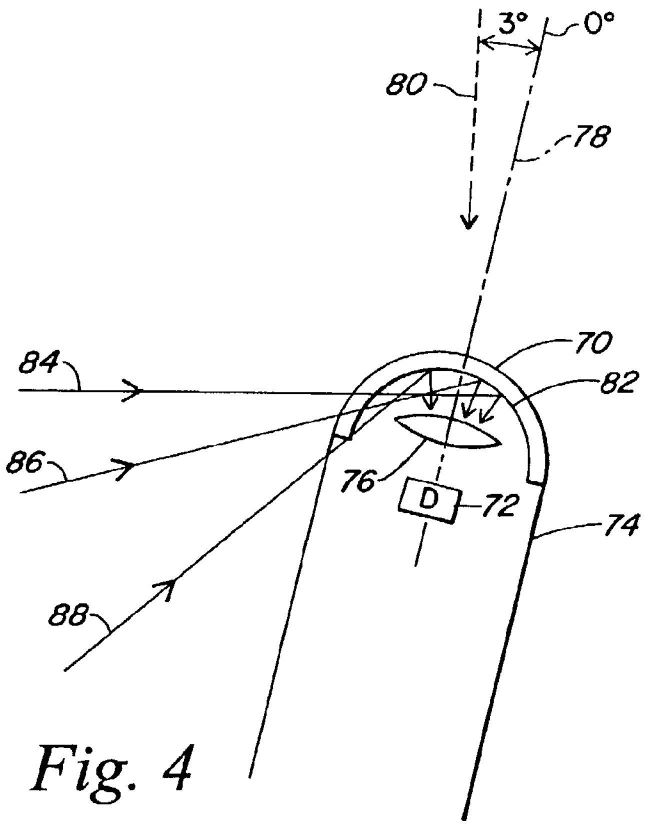
FIG. 4 is a diagrammatic illustration of a seeker dome used at the head of a missile illustrating total internal reflection of radiation coming from behind the missile that enters the dome and is internally reflected thereby so that it finally reaches the seeker's detector.

Referring now to FIG. 4, the reason that laser beams behind a missile are effective can be seen. Here an IR transmissive protective dome 70 is utilized to protect a detector 72 in a missile seeker of missile 74, in which the field of view of the detector is determined by optics 76.

In order to effectively countermeasure such a seeker, one ideally projects jamming radiation along the zero axis seeker centerline 78 so that a maximum of jamming power is directed into detector 72. In general it was thought that one needed to have incoming or incident radiation within 3° of the seeker centerline such as illustrated by dotted line 80.

However, and as part of the subject invention, has been found that laser beams either from the side or from behind the missile are effective to jam or countermeasure the missile.

The reason for the effectiveness of the rearwardly incident laser radiation is the internal refraction and reflection characteristics of dome 70. As mentioned hereinbefore, dome 70 is of a high index of refraction material which is selected so as to be transmissive at long infrared wavelengths. These long infrared wavelengths correspond to the heat generated by aircraft engines such that the infrared-detecting missile hones in on the detected heat signature from its target.

However, it has been found that the high index of refraction dome utilized for such missiles provides the dome with good total internal reflection characteristics and permits the reflection of off-axis incoming radiation onto the seeker detector. Thus, incoming radiation is reflected from the interior surface 82 of dome 70 back towards optics 76 where the radiation is imaged onto detector 72.

An off-axis incoming beam 84 coming in at approximately 90° or better with respect to axis 78 is internally reflected as illustrated, as is beam 86 coming in at over 100° and beam 88 coming in at over 150°.

The result of the above finding is that lasers can be fired at infrared detecting missiles from behind the missile as opposed to having to fire jamming radiation directly on-axis.

Figure 5:
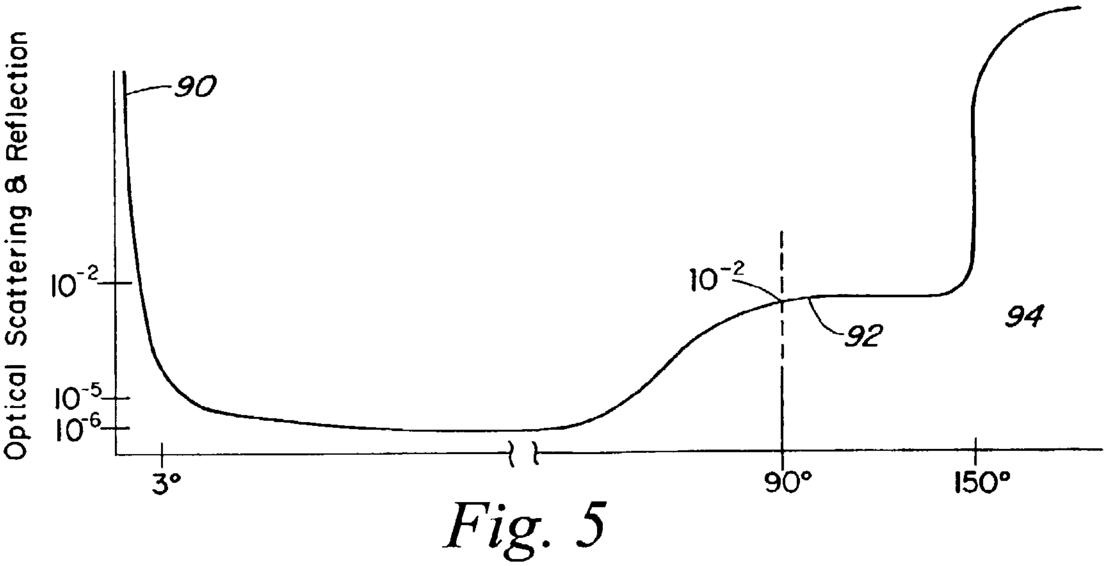
FIG. 5 is a graph of optical scattering and reflection versus angle of incidence showing that while on-axis detected power is high, the power detected by the seeker's detector drops off dramatically as low as $10^{-6}$ whereas at 90° and thereafter radiation projected towards the missile from its rear starts to be detected in sufficient power at 90° and at 150° is further increased; and, FIG. 6 is a diagrammatic illustration of the protection of an escorted aircraft through the utilization of a DIRCM on-board the escort aircraft flying ahead of the protected aircraft.

As can be seen from FIG. 5, the detected power of radiation incident on detector 74 of FIG. 4 relatively high for on-axis dome illumination as illustrated by curve 90. Detected power is reduced to $10^{-5}$ relative incident power for a 3° off-axis signal. After 3°, the amount of radiation available to detector 72 is quite minimal and on the order of $10^{-6}$.

However, and as illustrated at 92, at a 90° angle of incidence, the power of the jamming radiation increases to $10^{-2}$ clearly significant enough to effectuate jamming. Thereafter the optical scattering and reflection quantity is relatively stable at $10^{-2}$ until incident radiation comes in at 150° or better. At 150° as seen at 94 the effective power incident on detector 72 increases dramatically due to the single hop reflective characteristic of the dome.

What this means is that infrared missiles can be countermeasured or jammed by projecting radiation at the missile from behind the missile. This permits effective jamming of the missile from off-aircraft devices which may be located on the ground or on other vehicles. The result for commercial aviation is that commercial planes need not be retrofitted with countermeasure devices themselves. Not only is this a significant cost savings and a savings in time to deployment, no unsightly pods are visible on the plane to alarm the passengers. Moreover, terrestrially-based DIRCMs are available to be deployed immediately and do not require aircraft modification.

Figure 6:
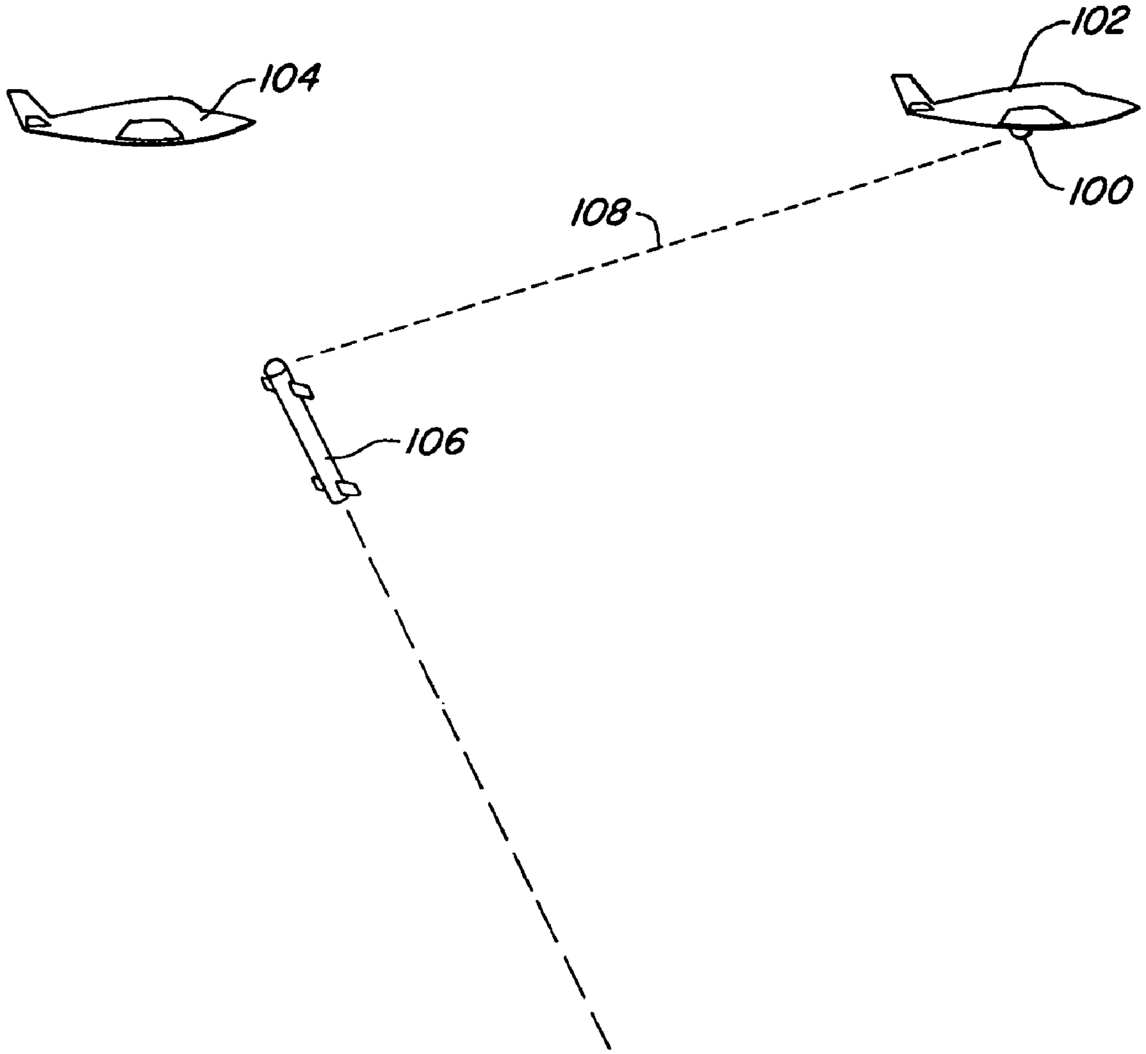

Additionally, as illustrated in FIG. 6, a DIRCM pod 100 may be placed on an escort aircraft 102 to protect an escorted aircraft 104 from attack from an IR guided missile 106. The reason is that illuminating radiation as illustrated by beam 108 from DIRCM pod 100 impinges on missile 106 typically at an angle at or exceeding 90°, depending how far ahead of aircraft 104 escort 102 is flying. Depending on the geometry, the escort plane can be aft of the escorted plane and can countermeasure the incoming missile from behind if the missile is chasing the targeted aircraft. Thus it is possible to protect a number of escorted aircraft utilizing a single IRCM pod on an escort aircraft.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for countermeasuring an IR guided missile from behind, with a modulated infrared beam from a source behind the missile, the missile, having a seeker dome and launched towards a target, comprising the steps of:

detecting the launch of the missile; and directing a modulated infrared beam towards the missile from a direction from behind the missile such that the angle relative to the longitudinal axis of the missile is greater than 90° but less than 170°, the modulated beam causing the missile to go off-target, the seeker dome being made of a high index of refraction material selected to be transmissive at long infrared wavelengths, such that a laser beam having an angle of incidence relative to the optical axis of the seeker greater than 90° but less than 170° is totally internally reflected.

2. The method of claim 1, wherein the infrared beam is a laser beam.

3. The method of claim 1, wherein the target is an aircraft operating along a flight path and wherein the modulated infrared beam is generated from a terrestrial module.

4. The method of claim 3, wherein the laser power and beam width define a maximum effective range for countermeasuring the missile and wherein a number of the modules are spaced about the flight path.

5. The method of claim 4, wherein the output power of the laser exceeds 100 Watts and the beam width of the beam is limited to below 100 microradians.

6. The method of claim 4, wherein the modules are dispensed about an airport.

7. The method of claim 6, wherein the effective range of the missile is 10,000 feet and wherein the modules are spaced about the potential airport flight paths so as to protect aircraft taking off or landing at the airport by countermeasuring missiles aimed at aircraft within range of the missile.

* * * * *